United States Patent
Nagara et al.

(10) Patent No.: US 8,902,968 B2
(45) Date of Patent: Dec. 2, 2014

(54) APPARATUS AND METHOD TO ACCOMMODATE CHANGES IN COMMUNICATION QUALITY

(75) Inventors: Toru Nagara, Tokyo (JP); Futoshi Takeuchi, Tokyo (JP); Akihiro Horii, Tokyo (JP); Masanori Sato, Tokyo (JP); Yuji Anami, Kanagawa (JP)

(73) Assignee: Sony Corporation (JP)

( * ) Notice: Subject to any disclaimer, the term of this patent is extended or adjusted under 35 U.S.C. 154(b) by 1091 days.

(21) Appl. No.: 12/924,165

(22) Filed: Sep. 22, 2010

(65) Prior Publication Data

US 2011/0080942 A1 Apr. 7, 2011

(30) Foreign Application Priority Data

Oct. 7, 2009 (JP) ................................. 2009-233936

(51) Int. Cl.
| | |
|---|---|
| H04N 7/12 | (2006.01) |
| H04N 19/102 | (2014.01) |
| H04N 19/169 | (2014.01) |
| H04N 19/115 | (2014.01) |
| H04N 21/4363 | (2011.01) |
| H04N 5/57 | (2006.01) |
| H04N 19/61 | (2014.01) |
| H04L 1/00 | (2006.01) |
| G06F 3/147 | (2006.01) |
| H04N 19/166 | (2014.01) |

(52) U.S. Cl.
CPC ........... *H04N 5/57* (2013.01); *H04N 19/00012* (2013.01); *H04N 19/00254* (2013.01); *G09G 2350/00* (2013.01); *G09G 2370/12* (2013.01); *H04N 19/0006* (2013.01); *H04N 21/43637* (2013.01); *H04N 7/50* (2013.01); *H04L 1/0015* (2013.01); *H04N 19/00781* (2013.01); *G09G 2340/02* (2013.01); *G06F 3/147* (2013.01); *G09G 2370/16* (2013.01); *H04L 1/0014* (2013.01); *H04N 19/00242* (2013.01)
USPC ........................................................ 375/240.01

(58) Field of Classification Search
CPC ........................................................ H04N 7/50
USPC ........................................................ 375/240.01
See application file for complete search history.

(56) References Cited

U.S. PATENT DOCUMENTS

| | | | | |
|---|---|---|---|---|
| 7,636,132 | B2 | 12/2009 | Sakamoto | |
| 2009/0196182 | A1* | 8/2009 | Barnett et al. | 370/236.1 |

FOREIGN PATENT DOCUMENTS

| | | |
|---|---|---|
| JP | 2004-343726 A | 12/2004 |
| JP | 2007-194706 A | 8/2007 |

* cited by examiner

*Primary Examiner* — Sath V Perungavoor
*Assistant Examiner* — James Pontius
(74) *Attorney, Agent, or Firm* — Lerner, David, Littenberg, Krumholz & Mentlik, LLP

(57) ABSTRACT

A transmission apparatus which may include an image encoder, a transmitter, and a controller. The apparatus may encode image data, wirelessly transmit the encoded image data, detect a quality of a wireless transmission of the encoded image data and control an image transmission rate based on the detected quality. The image transmission rate may be controlled within a first response time when being lowered and controlled within a second response time longer than the first response time when being raised.

5 Claims, 7 Drawing Sheets

APPARATUS AND METHOD TO ACCOMMODATE CHANGES IN COMMUNICATION QUALITY

CROSS-REFERENCE TO RELATED APPLICATION

The present application claims priority from Japanese Patent Application No. JP 2009-233936 filed in the Japanese Patent Office on Oct. 7, 2009, the entire content of which is incorporated herein by reference.

BACKGROUND OF THE INVENTION

1. Field of the Invention

The present invention relates to a transmission apparatus and a transmission method for wirelessly transmitting image data.

2. Description of the Related Art

In a system that wirelessly transmits compression-coded image data, a transmission apparatus controls a transmission rate based on a communication quality that changes with time due to a change in a communication environment. In other words, the transmission apparatus raises the transmission rate when the communication quality is high and lowers the transmission rate when the communication quality is low. As a method of detecting a communication quality that changes due to a change in the communication environment, there is a method of detecting a communication state based on an electric field intensity of reception radio waves, an error rate, and a retransmission request count that is based on an error rate (see, for example, Japanese Patent Application Laid-open No. 2004-343726 (paragraph [0009])). In addition, for suppressing a buffer overflow and underflow, the transmission apparatus controls an image transmission rate as a generated code amount of an encoder per unit time together with the transmission rate.

For example, Japanese Patent Application Laid-open No. 2007-194706 (paragraph [0005])) discloses a wireless communication system that performs communication by varying a compression rate of video and image data based on a radio wave propagation environment in which an error may be caused by multipath, changing a symbol rate (clock frequency) along therewith, and setting a propagation path difference due to multipath to fall within a range in which it does not become an error.

SUMMARY OF THE INVENTION

However, in an environment in which a wireless communication quality changes frequently, the image transmission rate of the transmission apparatus switches frequently. In this case, luminance and chromaticity of a display image on a reception apparatus side frequently change at a time the image transmission rate is switched, with the result that an image may flicker when viewed by a viewer and a subjective image quality may deteriorate.

Moreover, in a case where a technique called beam forming with which a direction of beams can be controlled after a directivity of the beams is narrowed so that radio waves reach the reception side efficiently is introduced or high bandwidth radio waves of, for example, 60 GHz that have high linearity is used, the communication quality fluctuates by a trivial cause and deterioration of a subjective image quality due to flickering of a display image becomes prominent. When a wireless transmission is held indoors between the transmission apparatus and the reception apparatus, a path of radio waves includes a reflection by a wall, furniture, window, and the like in a room depending on a positional relationship between the apparatuses. In this case, due to a slight change such as people moving in the room or a curtain being blown by a wind, the path changes to inadvertently change the communication quality. Moreover, even when there is no moving object, if there are a plurality of paths in which an equivalent level of radio wave intensities can be obtained, the paths are switched frequently to thus destabilize the communication quality.

Furthermore, a technique of avoiding an influence of a channel capacity fluctuation accompanying the fluctuation of the wireless communication state by installing as much a buffer as possible on the reception side may be adopted. In this case, however, large-capacity reception buffers are required. Considering wirelessly transmitting high-image-quality image data from an apparatus that requires a real-time response, such as a game machine, since less transmission delays are essential and a large amount of reception buffers cannot be provided, the communication quality is largely influenced by a fluctuation of the wireless state.

In view of the circumstances as described above, there is a need for a transmission apparatus and a transmission method that are capable of suppressing flickering of a display image on a reception side that accompanies a change in an image transmission rate and thus improving a subjective image quality.

According to an embodiment of the present invention, there is provided a transmission apparatus including: an encode section that encodes image data and is capable of controlling a generated code amount; a transmission section to wirelessly transmit the encoded image data; and a control section to detect a quality of a wireless transmission of the encoded image data and control, based on the detected quality, a wireless transmission rate as a transmission code amount of the transmission section per unit time and an image transmission rate as a generated code amount of the encode section per unit time, the image transmission rate being controlled within a first response time when being lowered and controlled within a second response time longer than the first response time when being raised.

According to the embodiment of the present invention, the control section controls the image transmission rate within the first response time when lowering it and controls the image transmission rate within the second response time longer than the first response time when raising it. Thus, it is possible to suppress flickering of an image accompanying a frequent change of the image transmission rate in a display image on a reception side and improve a subjective image quality.

More specifically, the control section may control the image transmission rate of the encode section to be raised at a time point a period during which the wireless transmission rate is higher than the image transmission rate has continued a certain period. Moreover, the control section may raise the image transmission rate stepwise toward the current image transmission rate every time the certain period passes when raising the image transmission rate. With this structure, flickering of an image when viewed by a viewer at the time the image transmission rate is switched can be additionally suppressed. In addition, since a time during which a low image transmission rate is used becomes that much shorter, deterioration of the subjective image quality can be suppressed.

The certain period is desirably 0.3 second to 1 second considering responsiveness of human eyesight to a temporal contrast change and chromaticity change. As a result, flickering of an image can be additionally suppressed.

According to the embodiment of the present invention, it is possible to suppress flickering of a display image on a reception side that accompanies a change in an image transmission rate and thus improve a subjective image quality.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.
(Structure of Wireless Transmission System)

Figure 1:
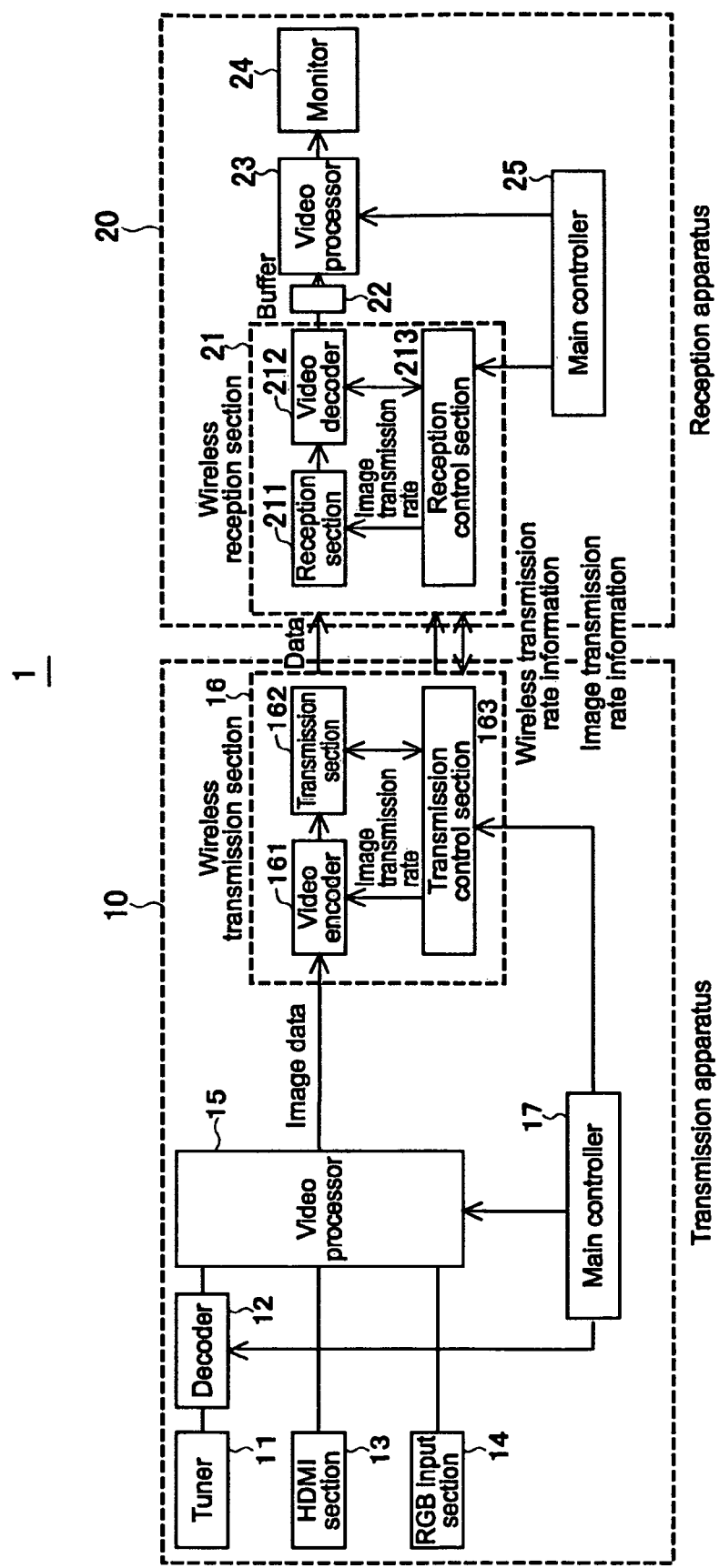
FIG. 1 is a diagram showing a structure of a wireless transmission system according to an embodiment of the present invention.

FIG. 1 is a diagram showing a structure of a wireless transmission system according to an embodiment of the present invention.

As shown in the figure, a wireless transmission system 1 is constituted of a transmission apparatus 10 and a reception apparatus 20. The transmission apparatus 10 is an apparatus that compression-codes image and audio data, modulates the data into a format suited for a wireless transmission, and transmits the modulated data using an antenna (not shown). The reception apparatus 20 is an apparatus that receives signals wirelessly transmitted from the transmission apparatus 10, restores the signals into an original image and audio through demodulation and decode, and outputs the data as a visible image and audible sound.

Here, the reception apparatus 20 is provided as, for example, a television receiver. The transmission apparatus 10 is provided as, for example, a media receiver that selectively obtains an image and audio via various transmission media such as a tuner and an external media player and wirelessly transmits them to the reception apparatus 20 such as a television receiver. With this system configuration, a compact and light television receiver from which built-in devices such as a tuner and a media drive are removed as well as a smart television receiver that has no lead-out wiring can be realized.

Referring again to FIG. 1, structures of the transmission apparatus 10 and the reception apparatus 20 will be described.

The transmission apparatus 10 includes a tuner 11, a decoder 12, an HDMI (High-Definition Multimedia Interface) section 13, an RGB input section 14, a video processor 15, a wireless transmission section 16, and a main controller 17.

The tuner 11 receives various digital broadcast signals of, for example, terrestrial digital broadcast, BS digital broadcast, and CS digital broadcast. The decoder 12 separates an image, audio, and other data from broadcast signals received by the tuner 11 and decodes them. The HDMI section 13 is a terminal for taking in digital data of an image and audio from a source apparatus such as a media player capable of reproducing various media such as a DVD (Digital Versatile Disc) and a BD (Blu-ray Disc) and a game machine. The RGB input section 14 is a terminal for taking in RGB data of an image from an external apparatus.

The video processor 15 selects data from outputs of the decoder 12, the HDMI section 13, and the RGB input section 14 and supplies the data to the wireless transmission section 16. The wireless transmission section 16 includes a video encoder 161 that compression-codes image data supplied from the video processor 15, a transmission section 162 that modulates the image data encoded by the video encoder 161 into a format suited for a wireless transmission and transmits the modulated data, and a transmission control section 163 that controls the video encoder 161 and the transmission section 162. It should be noted that although the transmission apparatus 10 actually includes a section that carries out processing for wirelessly transmitting audio data, an illustration and description thereof will be omitted here. The main controller 17 collectively controls the sections of the transmission apparatus 10.

The reception apparatus 20 includes a wireless reception section 21, a buffer 22, a video processor 23, a monitor 24, and a main controller 25.

The wireless reception section 21 includes a reception section 211 that restores compression-coded image data by receiving and demodulating image data wirelessly transmitted from the transmission apparatus 10, a video decoder 212 that decodes the compression-coded image data, and a reception control section 213 that controls the reception section 211 and the video decoder 212. It should be noted that although the reception apparatus 20 actually includes a section that carries out processing for wirelessly receiving audio data, an illustration and description thereof will be omitted here. The buffer 22 temporarily stores image data and the like output from the video decoder 212. The video processor 23 reads out image data stored in the buffer 22, converts it into display data or the like, and supplies the data to the monitor 24. The main controller 25 collectively controls the sections of the reception apparatus 20.

(Operation of Wireless Transmission System 1)

Next, an operation of the wireless transmission system 1 of this embodiment will be described.

Figure 2:
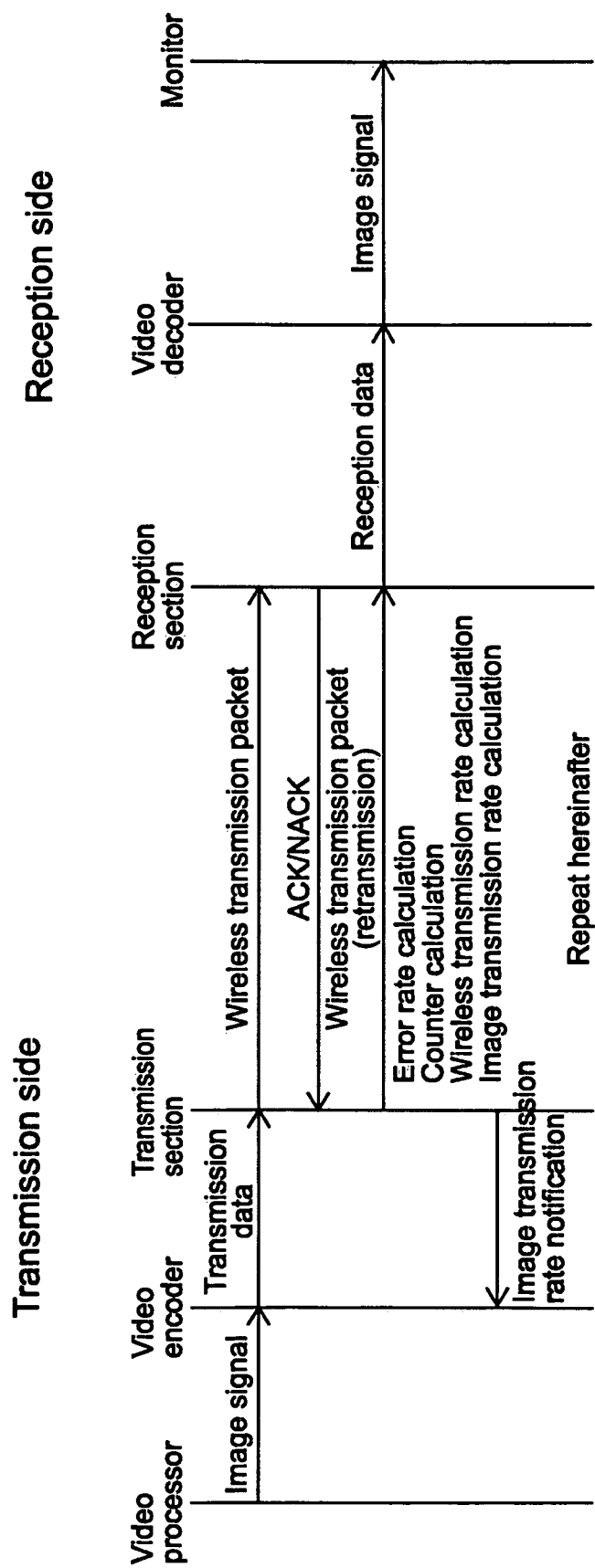
FIG. 2 is a sequence diagram of a wireless transmission in the wireless transmission system according to the embodiment of the present invention.

FIG. 2 is a sequence diagram of a wireless transmission in the wireless transmission system 1 of this embodiment.

Upon receiving image data supplied from the video processor 15, the wireless transmission section 16 of the transmission apparatus 10 encodes the image data by the video encoder 161 and supplies it to the transmission section 162. The transmission section 162 of the wireless transmission section 16 modulates the encoded image data supplied from the video encoder 161 into a format suited for a wireless transmission and transmits it as a wireless transmission packet.

Upon receiving the wireless transmission packet by the reception section 211, the wireless reception section 21 of the reception apparatus 20 demodulates it and also decodes it by the video decoder 212. At this time, a judgment on whether the packet has been received properly is made by ECC, parity check, and the like, and a result of the judgment is notified to the reception control section 213. When the wireless transmission packet has been received properly, the reception control section 213 controls a transmission section (not shown)

inside the reception apparatus 20 to send back an ACK packet to the transmission apparatus 10 wirelessly. While the image data decoded by the video decoder 212 is temporarily stored in the buffer 22, the image data is read out from the buffer 22 by the video processor 23 and supplied to the monitor 24 after being converted into display data.

Moreover, when a judgment result that the wireless transmission packet has not been properly received for some reason is received from the video decoder 212, the reception control section 213 of the wireless reception section 21 controls a transmission section (not shown) inside the reception apparatus 20 to send back a NACK packet to the transmission apparatus 10 wirelessly.

Upon receiving the NACK packet, the wireless transmission section 16 of the transmission apparatus 10 performs control to retransmit a relevant wireless transmission packet based on information for identifying a packet included in the NACK packet.

The transmission control section 163 of the wireless transmission section 16 calculates an error rate as a communication quality based on a ratio of a reception count of the ACK packet to a reception count of the NACK packet. Then, the transmission control section 163 controls, based on the error rate, a wireless transmission rate as a transmission code amount of the transmission section 162 per unit time and an image transmission rate as a generated code amount of the video encoder 161 per unit time.

As a method of changing a wireless transmission rate, there are a method of changing an encoding ratio, a method of switching a modulation system, and the like. As the modulation system to be switched, there are, for example, 64QAM (Quadrature Amplitude Modulation), 16QAM, QPSK (Quadrature Phase Shift Keying), and BPSK (Binary Phase-Shift Keying).

As a method of changing an image transmission rate, there are a method of changing a compression rate of an MPEG (Moving Picture Experts Group) compression and the like, a method of converting transmission data into a frequency signal instead of an amplitude direction signal using a DCT (Discrete Cosine Transform) conversion and the like to transmit it and switching up to where on a high frequency side the data is to be transmitted in each mode, that is, a method of changing low-pass characteristics according to the mode, a method of changing a thinning rate of pixels, a method of changing an accuracy of a color gradation (changing the number of low-order bits to be truncated), and the like.

Incidentally, it is generally the case that the wireless transmission rate and the image transmission rate have a one-on-one correspondence. In this case, however, when the wireless communication quality fluctuates frequently, the image transmission rate switches frequently to thus cause noises in which images flicker, with the result that a subjective image quality is deteriorated.

In this regard, in this embodiment, in controlling, based on the error rate, the wireless transmission rate as a transmission code amount of the transmission section 162 per unit time and the image transmission rate as a generated code amount of the video encoder 161 per unit time, the image transmission rate is controlled within a first response time when lowering it and controlled within a second response time longer than the first response time when raising it. In other words, since there is a fear that a communication capacity becomes short when the image transmission rate is kept high to thus cause an image error when the wireless transmission rate is lowered along with the deterioration of the wireless communication quality, the transmission control section 163 of the wireless transmission section 16 immediately (first response time) lowers the image transmission rate in this case and raises, when the wireless communication quality is improved, the image transmission rate at a time point a period during which the wireless transmission rate is higher than the image transmission rate has continued a certain period.

Figure 3:
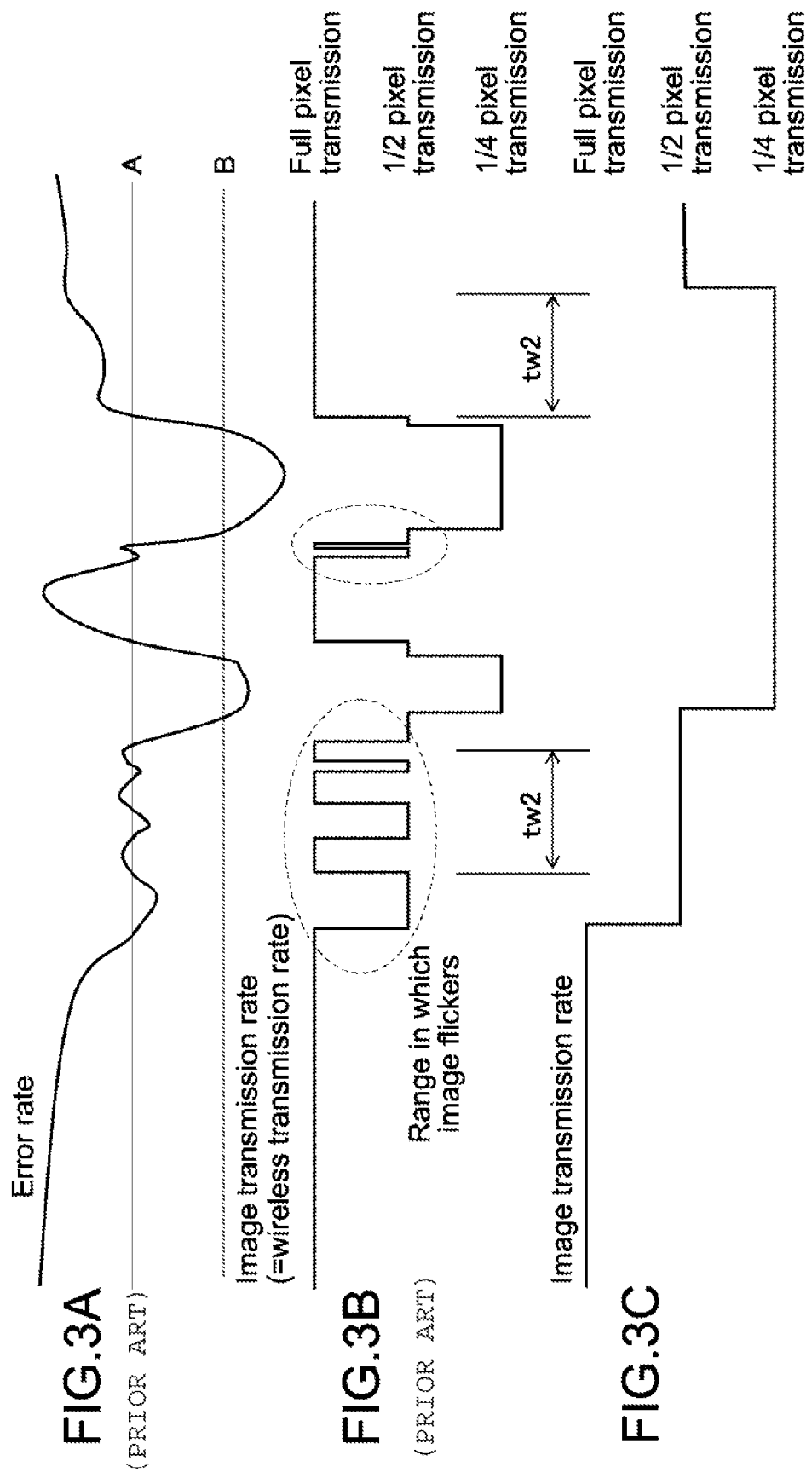
FIG. 3 are diagrams for comparing a state of a change of an image transmission rate with the prior art.

FIG. 3 are diagrams for comparing a state of a change of the image transmission rate with the prior art. Here, a pixel thinning method is adopted as the method of changing an image transmission rate, and the image transmission rate is changed by 3 steps of a full pixel, 1/2 pixel, and one pixel. The error rate is evaluated based on two types of threshold values A and B, and the wireless transmission rate is switched by 3 steps according to a magnitude relationship between the two types of threshold values A and B. Also in the figures, a logical value of the first response time is set to 0, and tw2 represents the second response time. FIG. 3A shows a temporal change of the error rate as a communication quality, FIG. 3B shows changes of the image transmission rate and the wireless transmission rate in the prior art, and FIG. 3C shows changes of the image transmission rate in this embodiment. As shown in the figures, in the prior art, the image transmission rate and the wireless transmission rate change simultaneously every time the error rate fluctuates with respect to the two types of threshold values A and B, and this has resulted in an appearance of flickering of an image. On the other hand, according to this embodiment, the image transmission rate and the wireless transmission rate do not change simultaneously, with the result that it becomes difficult for flickering of an image to be caused.

Figure 4:
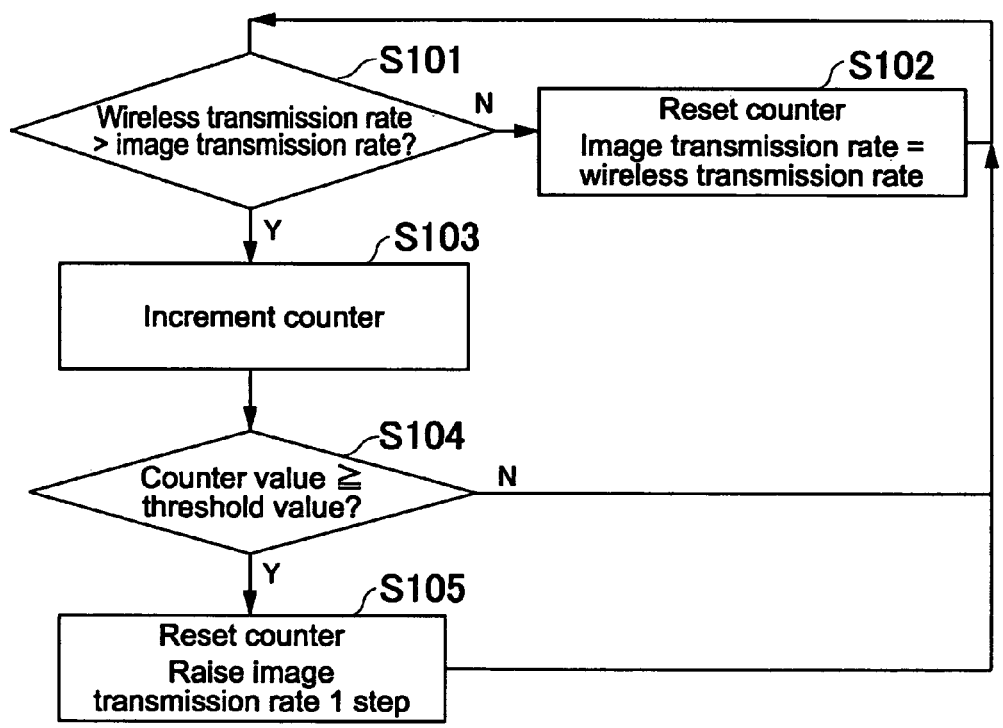
FIG. 4 is a flowchart showing an algorithm for calculating the image transmission rate.

FIG. 4 is a flowchart showing an algorithm for calculating the image transmission rate.

The transmission control section 163 compares a value of the wireless transmission rate and a value of the image transmission rate (Step S101). When judging that the value of the wireless transmission rate is equal to or smaller than the value of the image transmission rate, the transmission control section 163 immediately lowers the value of the image transmission rate to the wireless transmission rate (within first response time) (Step S102).

On the other hand, when judging that the value of the wireless transmission rate is larger than the value of the image transmission rate, the transmission control section 163 increments a counter value for counting a standby time (Step S103) and compares the incremented counter value with a threshold value (Step S104). When judging by the comparison that the counter value is smaller than the threshold value, the transmission control section 163 shifts to Step S102 to reset the counter and immediately lower the value of the image transmission rate to the wireless transmission rate (within first response time). On the other hand, when judging that the counter value is equal to or larger than the threshold value, the transmission control section 163 raises the wireless transmission rate one step (Step S105). By this algorithm, it becomes possible to control the image transmission rate within the first response time when lowering it and control the image transmission rate within the second response time longer than the first response time when raising it.

Raising the wireless transmission rate one step may mean setting the value of the wireless transmission rate to the current value of the image transmission rate. Alternatively, values may be set stepwise between the current value of the wireless transmission rate and the current value of the image transmission rate and raise the value of the wireless transmission rate one step at a time every time the counter value becomes equal to or larger than the threshold value (every time certain period passes). By adopting the latter method, flickering of an image that is seen by a viewer at a time the image transmission rate is switched can be additionally suppressed. Moreover, since a time during which a low image transmission rate is used is shortened that much, deterioration of a subjective image quality can be suppressed.

Figure 5:
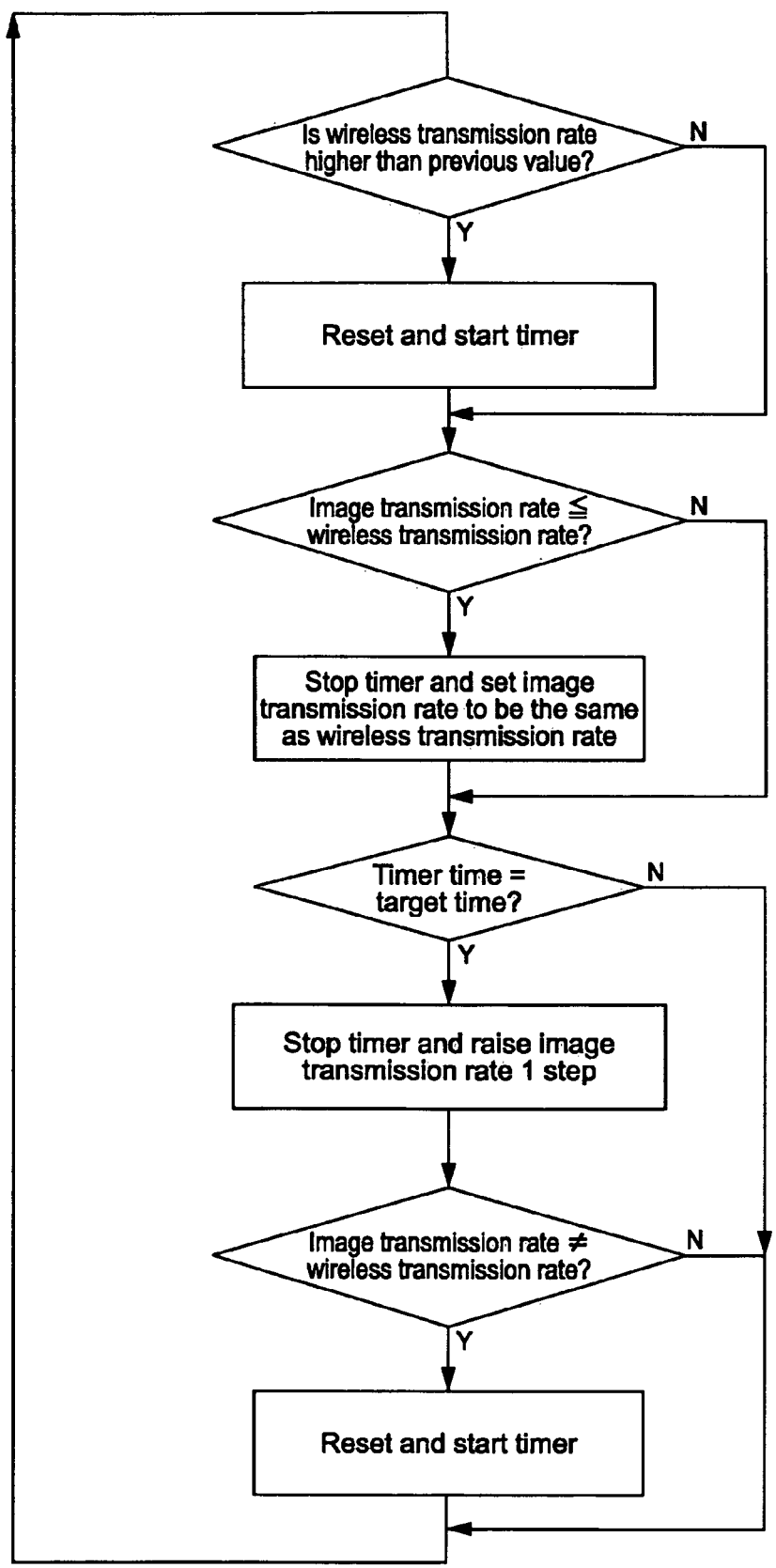
FIG. 5 is a flowchart showing another algorithm for calculating the image transmission rate.

Although the counter has been used for judging the certain period in the algorithm described above, the same processing can also be carried out using a timer. FIG. 5 shows another algorithm for calculating the image transmission rate using a timer.

Next, an optimal value of the second response time will be described.

An optimal value of the second response time can be obtained from responsiveness of human eyesight to a temporal contrast change and chromaticity change.

Figure 6:
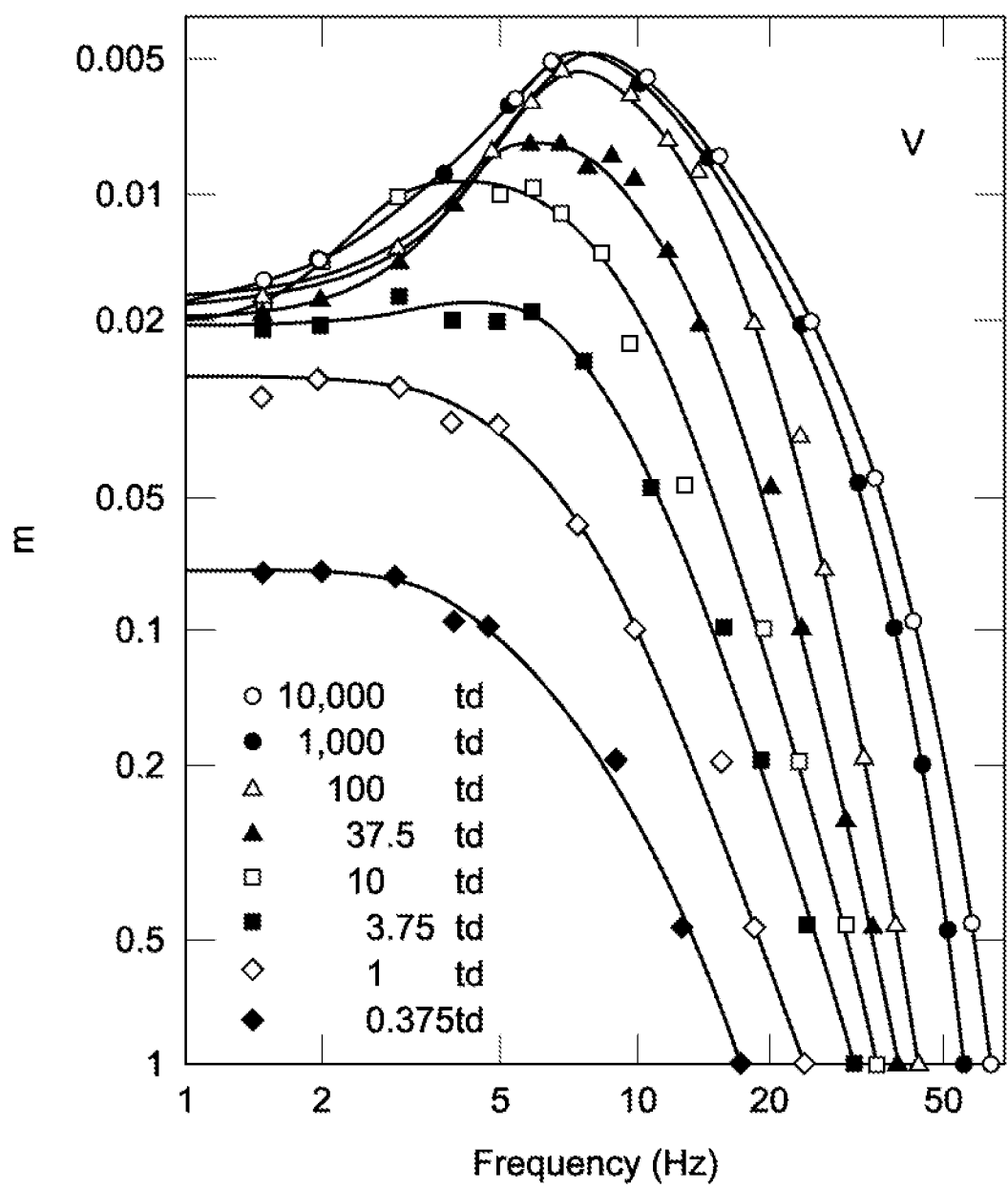
FIG. 6 is a graph of time frequency responsiveness on a visual contrast.
Figure 7:
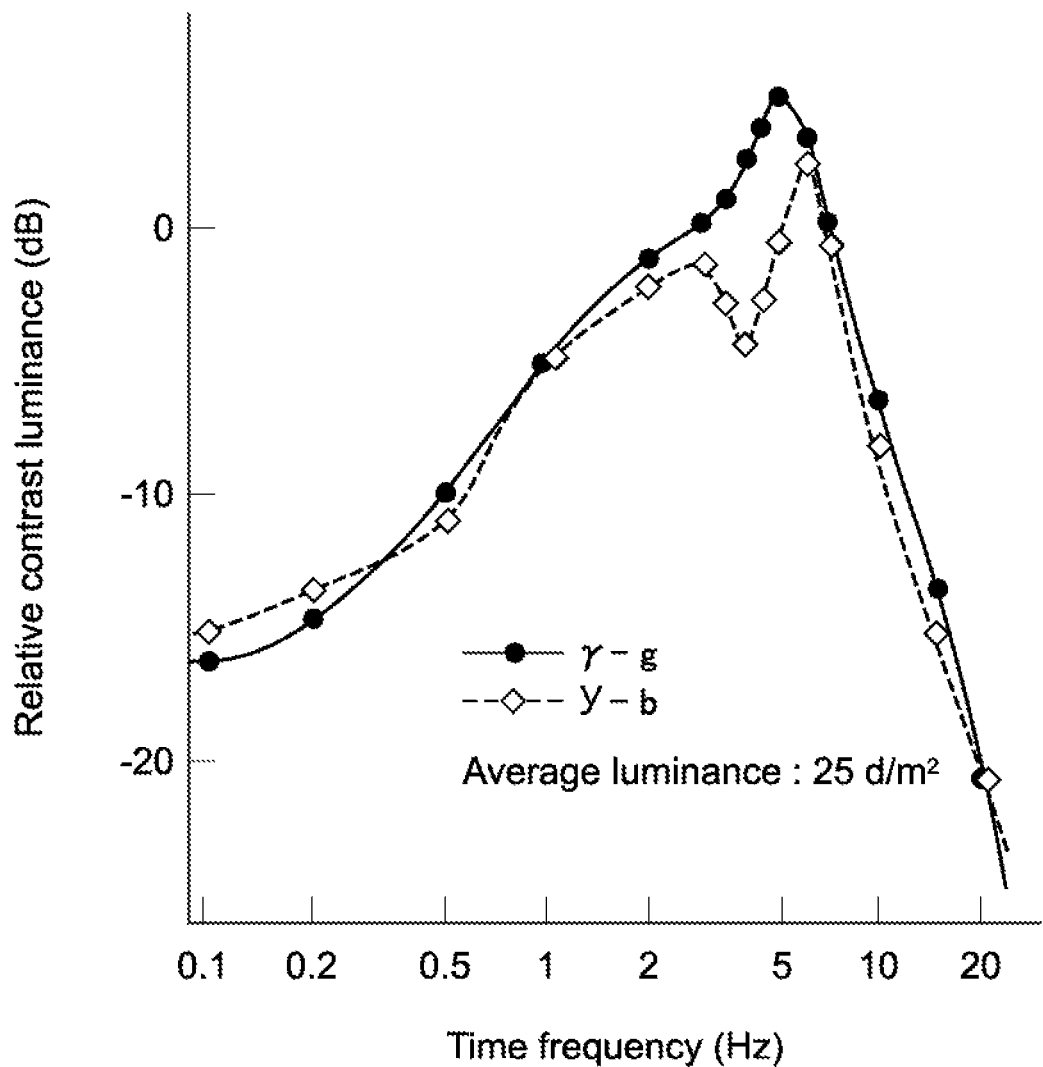
FIG. 7 is a graph of time frequency responsiveness on a visual chromaticity change.

FIG. 6 is a graph of time frequency responsiveness on a visual contrast (cited from "Series Leading Display Technology 1, Basics of display" by Iwao Oishi et al., 2001). According to the graph, a peak of visual responsiveness to a contrast appears around 10 Hz, and the visual responsiveness becomes substantially flat when the frequency is 2 Hz or less. It becomes easier for the change to be visually recognized as the second response time and the time of maintaining the image transmission rate become shorter. On the other hand, while it is difficult for the change to be visually recognized when the second response time is too long, since the time during which a low image transmission rate is used is prolonged that much, a subjective image quality deteriorates. FIG. 7 is a graph of time frequency responsiveness on a visual chromaticity change (similarly cited from "Series Leading Display Technology 1, Basics of display" by Iwao Oishi et al., 2001). According to the graph, responsiveness to a chromaticity change becomes equivalent to that of a contrast around 0.5 Hz, and a visual sensitivity continues to lower until reaching around 0.1 Hz. Therefore, it is desirable to set the second response time between 2 Hz (500 ms) at which a contrast response becomes flat and 0.1 Hz (10 s) at which a chromaticity response is saturated. Of those, a range from 0.3 Hz (3 s) to 1 Hz (1 s) that centers on 0.5 Hz (2 s) at which the responses to the contrast and chromaticity become of the same level is more desirable.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus, comprising:
   an image encoder that encodes image data to form encoded image data;
   a transmitter to wirelessly transmit the encoded image data; and
   a controller to detect a quality of a wireless transmission of the encoded image data and control, based on the detected quality, a wireless transmission rate as a transmission code amount of the transmitter per unit time and an image transmission rate as a generated code amount of the image encoder per unit time, the image transmission rate being controlled within a first response time when being lowered and controlled within a second response time longer than the first response time when being raised,
   in which the controller is configured to control the image transmission rate of the image encoder to be raised at a time point at which the wireless transmission rate has continued higher than the image transmission rate for a certain period, and
   in which the certain period is 0.3 second to 1 second such that when the wireless transmission rate has continued higher than the image transmission rate for 0.3 second to 1 second the controller raises the image transmission rate of the image encoder.

2. The transmission apparatus according to claim 1, wherein the controller raises the image transmission rate stepwise toward a current image transmission rate every time the certain period passes when raising the image transmission rate.

3. The transmission apparatus according to claim 1, in which the second response time is within a predetermined time range which is between 1 second and 3 seconds such that the first response time is less than the predetermined time range.

4. The transmission apparatus according to claim 1, in which the first response time is such as to cause the image transmission rate to be lowered immediately.

5. A transmission method, comprising:
   encoding image data to form encoded image data;
   wirelessly transmitting the encoded image data;
   detecting a quality of a wireless transmission of the encoded image data; and
   controlling, based on the detected quality, a wireless transmission rate as a transmission code amount per unit time and an image transmission rate as a generated code amount per unit time, the image transmission rate being controlled within a first response time when being lowered and controlled within a second response time longer than the first response time when being raised,
   in which the controlling includes controlling the image transmission rate of the image encoder to be raised at a time point at which the wireless transmission rate has continued higher than the image transmission rate for a certain period, and
   in which the certain period is 0.3 second to 1 second such that when the wireless transmission rate has continued higher than the image transmission rate for 0.3 second to 1 second the image transmission rate of the image encoder is raised.

* * * * *